United States Patent [19]

Blair, Jr. et al.

[11] Patent Number: 4,814,094

[45] Date of Patent: Mar. 21, 1989

[54] OIL RECOVERY METHOD UTILIZING HIGHLY OXYALKLATED PHENOLIC RESINS

[75] Inventors: Charles M. Blair, Jr., Buena Park; Charles A. Stout, Tustin; Raymond P. Olsen, Placentia, all of Calif.

[73] Assignee: Magna Corporation, Santa Fe Springs, Calif.

[21] Appl. No.: 98,414

[22] Filed: Sep. 18, 1987

Related U.S. Application Data

[63] Continuation of Ser. No. 811,893, Dec. 20, 1985, abandoned, which is a continuation of Ser. No. 745,379, Jun. 17, 1985, abandoned, which is a continuation of Ser. No. 364,738, Apr. 2, 1982, abandoned.

[51] Int. Cl.$^4$ .............................................. E21B 43/22
[52] U.S. Cl. .................................. 252/8.554; 166/274; 166/275; 525/507; 525/528; 525/129
[58] Field of Search ...................... 252/8.554; 166/274, 166/275

[56] References Cited

U.S. PATENT DOCUMENTS

| | | | |
|---|---|---|---|
| 2,356,205 | 8/1944 | Blair et al. | 252/8.554 |
| 2,454,541 | 11/1946 | Bock et al. | 252/331 X |
| 2,557,081 | 6/1951 | De Groote et al. | 252/331 |
| 3,583,486 | 6/1971 | Stratton | 252/8.554 |
| 4,260,019 | 4/1981 | Blair | 252/8.554 |

Primary Examiner—Herbert B. Guynn
Attorney, Agent, or Firm—Hubbard, Thurman, Turner & Tucker

[57] ABSTRACT

The method of recovering petroleum from a subterranean reservoir preferably comprising the steps of: (1) introducing through an injection well a predetermined amount of a polyalkylene oxide adduct of a fusible, aromatic hydrocarbon soluble synthetic resin which contains between about 4 to about 16 phenolic groups and is a condensate of a substituted phenol and an aldehyde, said condensate resin being further condensed with ethylene oxide and at least one other alkylene oxide containing 3 or 4 carbon atoms and in such amounts that the weight ratio of condensed alkylene oxide moiety to phenolic resin moiety ranges from about 1-to-1 to about 100-to-1 and the weight percentage of ethylene oxide residues to the total of all alkylene oxide residues ranges from about 20% to about 75%; said adduct (a) being soluble in water to the extent of about 1% or more at 25° C. and (b) said 1% solution having a cloud point of less than about 70° C.; (2) contacting said petroleum in said reservoir with an effective thin film forming amount of said polyalkylene oxide adduct; and (3) introducing into the formation an aqueous medium to urge said petroleum toward and through a producing well.

1 Claim, 1 Drawing Sheet

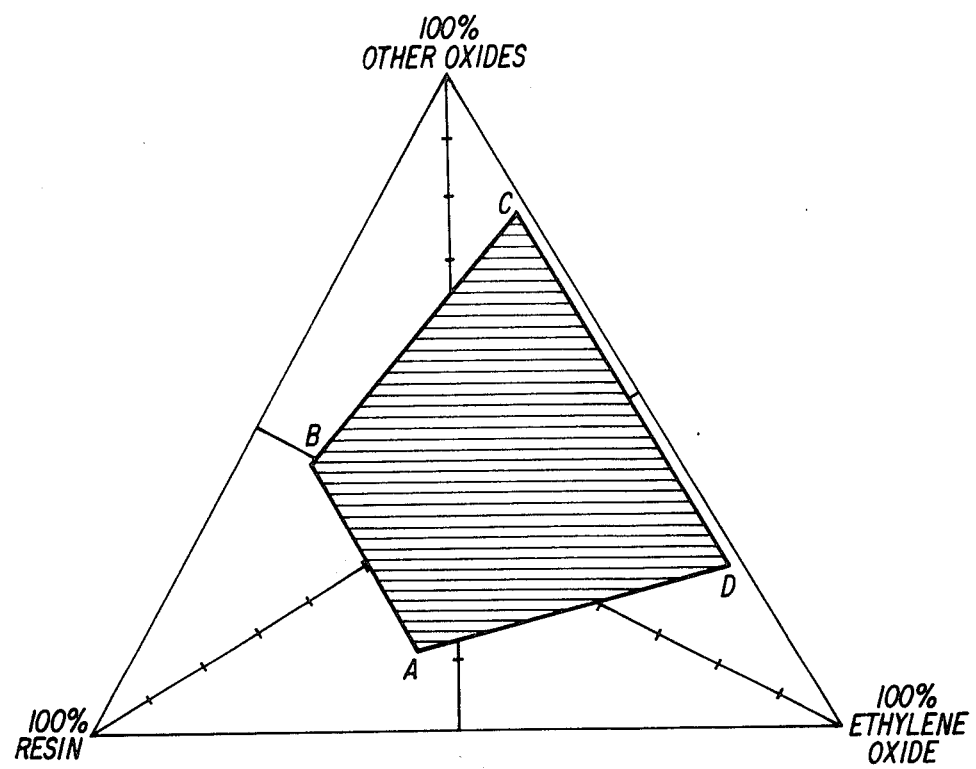

OIL RECOVERY METHOD UTILIZING HIGHLY OXYALKLATED PHENOLIC RESINS

This is a continuation of application Ser. No. 811,893, filed Dec. 20, 1985 which is a continuation of Ser. No. 745,379, filed June 17, 1985 which in turn is a continuation of Ser. No. 364,738, filed Apr. 2, 1982, all now abandoned.

FIELD OF THE INVENTION

This invention relates to a process for enhancing the recovery of petroleum and bitumen from subterranean strata and petroliferous rocks or sands. More specifically, it relates to new and improved aqueous flooding processes wherein the improvement comprises the utilization of a thin film spreading agent composition of a highly oxyalkylated phenolic resin which facilitates the displacement of petroleum oil and bitumen from source rocks.

DESCRIPTION OF THE PRIOR ART

It has long been known that the natural forces operating to cause flow of oil from source rocks into bore holes penetrating the rock are relatively inefficient in producing the oil. After the completion of such "primary" production, as much as 60% to 95% of the original oil-in-place may remain in the reservoir stratum.

For this reason, so-called "secondary" and "tertiary" recovery processes are usually applied to the reservoir at some point. Such processes include steam injection to provide additional reservoir energy for subsequent oil production and numerous other recovery methods which have been proposed wherein various fluids are injected into the oil-bearing formation to effect removal and recovery of additional oil from treated wells or from adjacent wells communicating with the reservoir. Such displacement methods are generally referred to as "flooding" and have utilized steam, water, brines, gas, caustic solutions, acidic solutions, aqueous solutions of detergents, high viscosity aqueous solutions of very high molecular weight polymers, oil solutions of detergents, micellar solutions, emulsions, liquified carbon dioxide and combinations of such methods. In some instances, one fluid may be injected for a time and is then followed by another and perhaps less costly fluid, such as water or brine. All such procedures are aimed at removing petroleum trapped in minute pores of the reservoir rock.

removal of petroleum from its source rock is believed to be a complex process involving the flow of two or more phases through a permeable solid phase. Many variables affect the results. For example, pore size in the rocks, viscosity of fluids, temperature, pressure, wettability characteristics of the rock, the composition of the oil phase, and numerous other properties all apparently play a part in the dynamics of petroleum production.

Much of the oil left in the rock formation during primary production appears to be trapped by forces of adhesion between oil and rock. Although not fully understood, most reservoir rocks appear to be "preferentially" wet by water, meaning that the contact angle between water and rock, measured through the water phase, is smaller than the contact angle between crude oil and rock, similarly measured. It is believed that the polar constituents contained in most crude petroleum oils, such as asphaltenes and other complex compounds, become absorbed on the polar rock surfaces to form thick, viscous, hydrophobic films which cause the rock to be wettable or partially wettable by the oil, prevent the close approach of and wetting by any aqueous phases and hinder the displacement and flow of the oil. Even in the presence of interstitial (connate) water or of injected aqueous fluids, only limited water wetting of the formation with displacement of the oil is effected.

Micellar solution flooding systems which are miscible with the petroleum, all of its dissolved components and water, were first disclosed and proposed for oil recovery in U.S. Pat. No. 2,356,205, dated Aug. 22, 1944, to Chas. M. Blair, Jr., and Sears Lehmann, Jr., entitled "Process For Increasing Productivity Of Subterranean Oil-Bearing Stata", the disclosure of which is herein incorporated by reference. These systems are capable of dissolving and removing such trapped oil as they can contact, but have not yet proven to be generally feasible because of the high cost of chemicals, solvents, and hydrotropic agents involved.

Aqueous flooding fluids containing acids, bases or detergent solutes have been employed to improve oil recovery by lowering oil-water interfacial tension sufficiently to lessen back pressure from dynamic surface and interfacial tension (Jamin) effects or to bring about emulsification of oil in the aqueous fluid, but with only limited improvement over the results of ordinary waterflooding.

None of these methods has clearly attempted to effect more complete water wetting of the formation by chemical means. Indeed, the use of water- or brine-soluble surfactants, such as detergents, for decreasing oil-water interfacial tension are generally ineffective in decreasing oil wetting or, alternatively, increasing water wetting of highly polar surfaces. Classical wetting theory shows quite generally that the work of adhesion for displacement of oil by water on a rock surface is decreased by lowering the oil/water interfacial tension and, as a consequence, the tendency of the water to displace oil is actually decreased.

Indirectly, aqueous caustic may reduce the oil wettability of rock by reaction with crude oil constituents and reduction of their oil wetting action. However, this method typically requires from ½% to 3% of caustic, and sometimes as much as 15%, to reduce the oil-wetting ability of the petroleum. Such high concentrations are costly and, in addition, bring about reactions with injected water or interstitial brine to form plugging precipitates of inorganic compounds such as calcium carbonate, strontium carbonate and magnesium hydroxide, thus stopping or greatly reducing the fluid injection process.

In U.S. Pat. No. 4,260,019, Blair disclosed a method for improving secondary and tertiary oil recovery by the use of a new composition which we called a "Thin Film Spreading Agent" or "TFSA" which exhibits the property of adsorbing at oil-rock interfaces to displace the oil-wetting agent and allow water wetting of the rock with displacement of the oil therefrom. The composition disclosed was a class of resinous polyalkyleneoxide adducts which were soluble to the extent of less than 1% in water and isooctane at 25° C.

Stratton, in U.S. Pat. No. 3,583,486, disclosed the use of resinous ethylene oxide adducts in waterflooding of oil formation. His products are extremely water soluble, were not shown to have any oil-rock interfacial spreading action and were employed as high concentration, viscous aqueous slugs for the purpose of affecting the hydrodynamics of water flow and providing a more uniform water front in the porous formation (mobility control).

SUMMARY OF THE INVENTION

It is a primary object of this invention to provide an improved method of oil recovery.

Another object is to provide a continuous or pretreating flood of a thin film spreading agent composition having present therein a highly oxyalkylated phenolic resin quite different in composition and properties from those previously used, to improve the recovery of oil by concurrent or subsequent flooding with water or other aqueous systems such as viscous, aqueous polymer solutions, caustic solutions, detergent solutions, steam, condensed steam, and mixtures of aqueous systems with carbon dioxide, nitrogen, hydrocarbons, and other adjunct flooding agents.

The TFSA compositions used in the practice of the present invention differ from those used in the process of my patent cited above in that they are soluble in water at 25° C. (although they are incompletely soluble at more elevated temperatures). They differ from the process of Stratton in that they contain relatively high proportions of akylene oxide residues derived from oxides containing more than two carbon atoms. Further, they display appreciable solubility in aliphatic hydrocarbons in comparison to oxyethylated resins.

We have found that the ability of crude oil to wet and adhere to rock surfaces in the presence of water can be substantially reduced by injection of this class of organic compositions into the petroleum or bitumen reservoir and that, by suitable application of these compounds ahead of or in conjunction with water, steam, and other fluids such as those described above, significant increases in the recovery of the petroleum is effected.

We believe that the compositions used in the present method probably act by adsorbing preferentially at the petroleum-rock interface where it spreads to displace the thick, semi-solid film of previously adsorbed, naturally occurring oil-wetting agent from the petroleum, forcing it back into solution or dispersion in the oil phase, leaving in its place a very thin, mobile, monomolecular, semi-polar adsorbed film. The tendency of the oil to adhere to or wet the rock is thereby reduced. As aqueous fluids are pumped into the reservoir, the oil is then more readily pushed away. Also, since the TFSA forms such thin layers on mineral surfaces, it permits close approach of the mineral and aqueous flooding fluids surfaces, sufficiently close, indeed, to permit the powerful short range molecular forces of attraction between polar molecules to become effective and to bring about wetting of the rock by the aqueous fluid. As this oil displacement and water wetting process proceeds, the temporary film of TFSA, itself, is displaced just as the aqueous phase displaces the petroleum phase on the rock, and becomes dispersed in the oil or the flood water to be carried forward toward the untreated portions of the formation. Contact of displaced petroleum with petroleum masses adhering to the rock downstream permits the TFSA to become adsorbed again between oil and rock and to effect further oil displacement by aqueous flooding fluids.

Besides adsorbing on rock surfaces, the asphaltenes and other complex polar constituents in the crude petroleum oil adsorb strongly at interfaces between the oil and water or brine, forming thick, viscous layers which resist flow forces, stabilize viscous emulsions within the flooded rock zone and inhibit oil displacement.

A further object of the invention is to replace such viscous interfacial films with very thin, mobile films of the TFSA and thereby lessen the viscosity of the interstitial oil and water fluids, decrease flow resistance, minimize the formation of interstitial emulsions and increase the production of petroleum oil.

Regardless of any theory or proposed mechanism for the function of the TFSA composition and method, the utility of these products for removal of oil from rock surfaces has been clearly established by experiments described below.

The TFSA compound may be introduced as a minute dispersion, a micellar solution or an emulsion in the flood water from which it may migrate and diffuse into the oil phase to spread after adsorption on rock surfaces adjacent to the oil-wet surfaces. Although, as pointed out above, the TFSA compounds are not highly soluble in hot water, they are soluble to some very small extent sufficient to permit some diffusion through the water phase to the oil. Additionally, contact of minute dispersed particles of, or micelles containing, TFSA with the oil phase as the result of flow of the water phase through the rock will facilitate transfer to the oil phase, as will the active spreading of the TFSA at water-oil interfaces. Still further, the TFSA may actually be introduced as a preliminary batch or "slug" dissolved in an organic solvent for the material to be pushed along by the following flow of injected water.

While, as stated above, the products described herein are broadly useful in improving the recovery of oil in aqueous flooding systems, they appear to be especially effective in applications where the temperature of the aqueous system is somewhat elevated Thus, they are especially effective in steam stimulation—so-called "huff and puff" operations—, in steam drives, in hot waterfloods and in floods where the oil formation temperature is above the cloud point of a 1% aqueous solution of the TFSA being used.

BRIEF DESCRIPTION OF THE DRAWING

The drawing graphically illustrates the oxide/resin percentages of the present invention in the crosshatched area bounded by the points A, B, C, and D.

DESCRIPTION OF THE PREFERRED EMBODIMENTS

The compositions which we have found to be effective in the present process have the following properties:

(a) They are soluble to the extent of 1% or more in water at 25° C., (b) One percent (1%) aqueous solutions display a cloud point below about 70° C.

Products meeting these requirements are generally organic polymers or semipolymers with average molecular weights between about 3,000 and 200,000 and having structures which allow orientation on polar surfaces such that the polar elements of the molecule lie in a plane and hold most of the entire molecule at the interface as a thin layer. To effect such thin film formation at oil-water and oil-rock interfaces the compounds generally must contain highly distributed hydrophilic and hydrophobic groups without such concentrations of either group as to prevent adsorption at interfaces in a film generally parallel with the interface and having a very small thickness.

The products useful in the process resemble products which have been found effective for breaking petroleum emulsions, but for most applications for oil recovery the products will tend to be somewhat more or less hydrophobic than the demulsifier actually used on the water-in-oil emulsion produced from the formation to be treated. However, the actual product to be used for a given system is best selected by laboratory tests to be described below rather than by its chemical similarity to demulsifiers or other surface-active agents which may have been used in the system.

The compositions appear not to be effective micelle-forming compounds in the manner of detergents, soaps and the surfactants such as those previously used in aqueous floods. They also appear to differ from formerly used surfactants in that their effects on oil-water interfacial tensions as a function of concentration are limited. While spreading efficiently at such interfaces to form thin films with spreading pressures up to about 35 to 40 dynes per cm, addition of larger amounts of TFSA have relatively little effect on interfacial tension. Also, the present agents, in contrast to formerly used surfactants, have relatively little or no tendency to stabilize either oil-in-water or water-in-oil emulsions when present in normal use amounts.

The compositions effective in our process constitute a limited portion of the field of compositions broadly described in U.S. Pat. No. 2,557,081, issued June 9, 1951 to DeGroote and Keiser. In the present process the products useful in improving oil recovery have compositions within the area of the accompanying drawing bounded by the points marked A, B, C, and D.

The products within this area contain more than about 1% and less than about 50% by weight of phenolic resin moiety and the total reacted alkylene oxide moiety is made up of at least about 25% and not over about 80% of alkylene oxide residues containing three to four carbon atoms. The remaining 20% to 75% of alkylene oxide moiety is comprised of ethylene oxide residues.

The most common resin employed in the synthesis of TFSA is an alkyl or cycloaliphatic substituted phenolaldehyde resin prepared by condensing an ortho- or para-substituted phenol with an aldehyde, most commonly with formaldehyde or a formaldehyde progenitor such as paraformaldehyde or trioxane, under mildly alkaline or acidic conditions to form a fusible and xylene-soluble polymer of low or moderate molecular weight and which typically will contain from between about 4 to about 16 phenolic groups. This resin is then condensed, usually employing an alkaline catalyst, with ethylene oxide and one or more other alkylene oxide containing 3 or 4 carbon atoms and exemplified by propylene oxide, butylene oxide, glyceryl chlorohydrin, epichlorohydrin and glycidol.

Cloud points of 1% TFSA solutions in water may be determined by the procedure described in "Systematic Analysis of Surface-Active Agents", Second Ed. by M. J. Rosen and H. A. Goldsmith, Wiley Interscience, New York, (1972), p. 293 et sq.

Solubility tests may be run by placing a 1 ml sample (or the weight of solid product calculated to have a volume of 1 ml) in a graduated cylinder of the type which may be closed with a ground glass stopper. Place 100 ml of water in the cylinder, close, place in a 25° C. water bath until thermal equilibrium is reached, remove from the bath and shake vigorously for one hour. Return to the bath for five minutes and then repeat the shaking procedure. Finally, return to the bath and allow to stand quietly for one hour. Examine the cylinder contents carefully. Any cloudiness or opacity of the liquid phase or the appearance of any sediment or undissolved material in the cylinder indicates that the product does not have the requisit solubility.

A typical composition suitable for practicing the present invention may be prepared by reacting formaldehyde or a substance which breaks down to formaldehyde under the reaction conditions, e.g., paraformaldehyde and trioxane, and a difunctional, with respect to reaction with formaldehyde, alkyl phenol, often a crude mixture of alkyl phenols for economic reasons, by heating the reactants between about 100° and about 125° C. in the presence of a small amount of an acid catalyst such as sulfamic acid or muriatic acid or, alternatively, in the presence of an alkaline catalyst such as sodium hydroxide or sodium methylate and, preferably, under substantially anhydrous conditions, excepting for the water produced during the reaction. The aqueous distillate which begins to form is collected and removed from the reaction mixture. After several hours of heating at temperatures slightly above the boiling point of water, the mass becomes viscous and is permitted to cool to about 100° to 105° C. At this point, an aromatic hydrocarbon solvent such as xylene may be added, and heating is resumed. Further aqueous distillate begins to form, and heating is continued for an additional number of hours until at least about one mole of aqueous distillate per mole of the formaldehyde has been distilled off. Xylene or other hydrocarbon which may be distilled with the water is returned to the reaction mass. The temperature at the end of the reaction reaches about 180° to 250° C. The product is permitted to cool to yield the phenolformaldehyde condensation product in the aromatic solvent.

The molecular weight of these intermediate condensation products cannot be ascertained with certainty, but it is estimated that the resins employed herein should contain from between about 4 to about 16, preferably from about 8 to about 12, phenolic nuclei per resin molecule. The solubility of the condensation product in hydrocarbon solvent would indicate that the resin is a linear or sheet-like polymer, thus distinguishing it from the more common phenol-formaldehyde resins of the insoluble cross-linked type.

Having prepared the intermediate phenol-formaldehyde products, the next step is the oxyalkylation of the condensation products with alkylene oxide. This is achieved by mixing the intermediate phenol-formaldehyde condensation product as is or contained in the aromatic solvent with a small amount of a suitable catalyst, usually potassium hydroxide or sodium methylate, in an autoclave. The condensation product is heated above 100° C., and ethylene oxide, propylene oxide, butylene oxide or other of the suitable oxides named above or mixtures of two or more of these oxides, either as a mixture or by sequential addition of first either one or another of the oxides is charged into the autoclave until the pressure is in the vicinity of 75 to 100 psi.

The reaction mixture is gradually heated until an exothermic reaction begins. The external heating is then removed, and alkylene oxide or oxide mixture is added at such a rate that the temperature is maintained between about 130° to 160° C. in a pressure range of 30 to 100 psi. After all of the alkylene oxide has been added, the temperature is maintained for an additional 10 to 20 minutes to assure substantially complete reaction of the alkylene oxide. The resulting product is the alkylene oxide adduct of an alkyl phenol-formaldehyde condensation product, in which the weight ratio of the combined oxides to the phenolic resin moiety (on a solvent-free basis) is between about 1-to-1 and about 100-to-1.

The invention is further illustrated in the following examples:

EXAMPLE I

P-dodecyl phenol is employed as the alkyl phenol to produce a resin by the procedure described above, employing a small amount of dinonyl phenol sulfonic acid as catalyst. After completion of the resin-forming reaction the acid is neutralized with aqueous KOH and an excess of about 0.2% KOH is further added. Water is removed by warming under a vacuum for one hour after which the vessel is closed and a mixture of equal weights of propylene and ethylene oxide is then added in an amount equal to three times the weight of dodecyl pheonl-formaldehyde resin (solvent-free basis) such additions being carried out under about 40 psi pressure over a three-hour period. The product meets the two criteria set forth above for establishing and determining utility in the present invention.

EXAMPLE II

Into a 1500 gal. stainless steel reactor equipped with a steam jacket, internal cooling coils, stirrer, reflux and decanter condensor, steam jet vacuum and appropriate inlet feedlines and valving was placed
  1000 lbs. of xylene
  1000 lbs. of para-t-amyl phenol
  180 lbs. of paraformaldehyde After the vessel was closed and warmed to about 55° C., 1.5 lbs. of 50% aqueous caustic soda solution was introduced. A mildly exothermic reaction ensued. The condensor was opened to a decanter, the vacuum jet was activated and the temperature was slowly increased to 165° C. while removing water from the reaction mass. At this point resin formation was essentially complete.

The contents of the vessel, while warm, were then pumped into a 4,000 gal. similarly equipped vessel. Thirty-three pounds of additional 50% caustic soda was added, with stirring, to the resin solution and a full vacuum applied to the vessel while heating at 150° C. to remove water.

The vessel was then closed, cooled to 135° C. and ethylene oxide was introduced at a rate to maintain a temperature of about 120° to 130° C. until a total of 6,700 lbs. of ethylene oxide had been introduced and the pressure in the vessel had dropped to about atmospheric. At this point the temperature was increased to about 150° C. and propylene oxide was introduced slowly while maintaining the temperature between 150° and 165° C. and until a total of 8,000 lbs. of propylene oxide had been added. Stirring and heating was continued for an additional hour. The product was cooled and filled into drums.

A sample of the product, after vacuum stripping of xylene, had the following properties:
  Solubility in water at 25° C.: greater than 1%;
  Cloud Point of 1% Aqueous Solution: abt. 56° C.

EXAMPLE III

Into a 4,000 gal. vessel equipped like that of EXAMPLE II was placed 1,000 lbs. of xylene, 1,000 lbs. of p-t-butylphenol, 50 lbs. of dodecylbenzene sulfonic acid, and 190 lbs. of trioxane. The condensor was connected to a decanter which separated water from the condensate and returned xylene to the vessel. The temperature was raised to 135° C. and held until water evolution was essentially complete. Thirty pounds of a 50% aqueous KOH slution was then introduced with stirring.

At this point the vessel was closed and, the temperature was brought to 160° C. 6,800 lbs. of propylene oxide were then introduced while maintaining a pressure not in excess of about 50 psi. After completion of this addition and a pressure drop to about atmospheric, the temperature was reduced to 135° C. and 5,700 lbs. of ethylene oxide were introduced at a rate to maintain this temperature without excessive pressure build-up. The final product was a viscous oil. A sample, after removal of xyleneby vacuum stripping was found to have the following properties
  Solubility in Water at 25° C.: greater than 1%;
  Cloud Point of 1% Aqueous Solution: 48° C.;
  Solubility in n-Hexane: 1.65 mg./ml.

EXAMPLE IV

Using the equipment and procedure of EXAMPLE III, 1,000 lbs. of p-t-nonylphenol was substituted for the butyl phenol used in this previous example.

After completion of the resinification reaction, 18,000 lbs. of an equal weights mixture of ethylene and propylene oxide were added to the resin solution while stirring at 140° to 165° C. The final product, on a solvent free basis, contained about 5% of phenolic resin moiety and about 95% combined alkylene oxides. The solvent-free product had the following properties:
  Solubility in water at 25° C.: more than 1%;
  Cloud Point of 1% Aqueous Solution: 53° C.;
  Solubility in n-Hexane: 1.48 mg/ml.

Selection of the best TFSA product for use in a given field application is best done by laboratory test procedures which have been found to have predictive value for other enhanced recovery methods. For disclosures of such procedures, reference is made to procedures given in "Oil-in Water Emulsions and Their Flow Properties in Porous Media," by C. D. McAuliffe, *Journal of Petroleum Technology*, June 1973, p. 727, et seq., and to U.S. Pat. No. 3,163,214, entitled "Solvent-Waterflood Oil Recovery Process," issued Dec. 29, 1964, to Csaszar, each of the disclosures being herein incorporated by reference.

Among such procedures, one which has been found useful in selecting a suitable TFSA involves a determination of oil displacement efficiency from prepared oil-containing rock cores in equipment described below. A tube of glass or transparent polymethacrylate ester, having an inside diameter of about 3.5 cm (1½ inches) and a length of about 45 cm (18 inches), is fitted with inlet connections and appropriate valves at each end. The tube is mounted vertically on a rack in an air bath equipped with a fan, heater and thermostat which allows selection and maintenance of temperatures in the range of between about 25° to 80° C.

To select the most efficient TFSA for use in a given oil formation, samples of the oil, of the producing rock formation and of the water to be used in the flooding operation were obtained. The formation rock is extracted with toluene to remove oil, is dried and is then ground in a ball mill to the point where a large percentage passes an 80 mesh sieve. The fraction between 150 and 400 mesh in size is retained. The tube described above is removed from the air bath, opened and, after insertion of a glass wool retainer at the lower end, is packed with the ground formation rock. The tube is tapped gently from time-to-time during filling to ensure close packing and is visually inspected to assure absence of voids.

The tube is then returned to the air bath, connected to the inlet tubing, the temperature is adjusted to the oil formation temperature and oil from such formation is admitted slowly through the bottom line from a calibrated reservoir in an amount just sufficient to fill the packed rock plug in the tube. This volume is determined from the calibrations and is referred to as the "pore volume", being that volume of oil just sufficient to fill the pores or interstices of the packed plug of rock.

The tube is now closed and left in the air bath at the selected temperature for a period of from one to, perhaps, five days to allow establishment of equilibrium between the ground formation rock and the oil with respect to adsorption of oil constituents on the rock and lowering of interfacial tension. The time allowed for equilibrium may be varied widely. At higher temperatures, the time required to reach equilibrium is probably reduced. Usually, for comparative tests, three days are allowed to age the oil-rock plug. Results with this procedure closely simulate work with actual cores of oil-bearing rock.

The oil and water samples used for test purposes are preferably taken under an inert gas such as high purity nitrogen, and are maintained out of contact with air during all manipulations in order to prevent oxidation of the oil and concomitant introduction of spurious polar, surface-active constituents in the oil. At this point, the rock-oil system simulates the original oil formation before primary production of oil was commenced and well before any secondary waterflood operation.

The lower inlet line to the tube is now connected to the sample of water used in the flooding of the oil formation and, by means of a peristaltic pump or similar very small volume positive displacement pump, the water is pumped into the sand body from the bottom to displace fluids out of the top tubing connection into a calibrated receiver. The pumping rate is adjusted to one simulating the rate of flood water advance in an actual operation, which is usually in a range of 10 to 50 cm per day. Pumping is maintained at this rate until one pore volume of water has been pumped through the sand.

The volumes of fluids collected in the receiver are measured at this point and the relative amount of oil and water displaced from the rock sample are determined and recorded. Of special interest is the volume of oil displaced as a fraction of the original oil-in-place. This information may be viewed as an indication of the approximate percentage of oil originally in place which is produced by natural water drive following drilling of a well into the rock formation and after the primary phase of field production.

Following this step, several additional pore volumes of water containing the TFSA composition to be tested are pumped slowly through the plug and the volumes of additional oil and water displaced are determined. Alternatively, the TFSA composition dissolved in a relatively small volume of water, may be pumped into the plug and followed with several pore volumes of flood water. Typically, where such an initial "slug" of TFSA is introduced it may be contained in a volume of fluid ranging from 1% to 100% of the pore volume, but most frequently it will be in a slug volume of 10% to 50% of pore volume.

After this final displacement step, the produced oil and water are again measured. By comparing the amount of oil produced by this additional injection of water containing, or preceded by a solution, of TFSA with the amount produced when the same volume of water containing no TFSA is injected, one can evaluate the effectiveness of the particular TFSA composition used for enhancing the recovery of additional oil over and above that obtained by ordinary waterflooding alone.

The procedure for selecting and evaluating the present compounds for their use in enhancing oil recovery is exemplified in the following Evaluation Tests.

EVALUATION TEST A

A pure, white silica sand, ground to and selected in the size range from 150 to 400 mesh was used to prepare four cores as described above. The finished, packed cores had permeabilities to nitrogen of about 2,500 millidarcies. Clean, chemical-free crude oil (density of 0.980 and viscosity of 9,500 cp. at 25° C.) from the Midway-Sunset field in Kern County, CA., was pumped into the cores until they were filled. Weighings before and after filling showed that the packs all contained an average of 107 gms. of oil within an average deviation of 2%. The cores were aged for five days at 72° C. Then, while maintaining this temperature, water was pumped into each column at the rate of 18 ml. per/hour until one pore volume of fluid had been displaced. In each case the collected fluid was centrifuged with a trace of demulsifier and added solvent to determine the relative volumes of oil and water produced. From the volume of oil produced, the amount remaining in each column was calculated. This volume is referred to as the residual oil-in-place.

The product of EXAMPLE III was compounded into a readily water dispersible homogeneous micellar solution as described in U.S. Pat. No. 4,309,306 issued Jan. 5, 1982 to Charles M. Blair, Jr. A solution of this micellar solution was then prepared in water which was pumped into two of the columns to displace fluids therein. The amount of micellar solution was such as to supply 120 ppm of the TFSA of EXAMPLE III in the water. Injection of the water containing TFSA was continued at the rate of 18 ml. per hour in each column until 1.4 pore volumes had been injected. At this point the TFSA solution was replaced with water, alone, and injection was continued for 1.6 additional pore volumes—thus giving a total of 3 pore volumes of flood water following the one after which residual oil content was calculated.

During the injection period, produced fluids were collected regularly and analyzed for oil content.

Simultaneously with the flooding of the two columns in which TFSA was injected, the two other columns were flooded with water alone to provide a reference with which to judge the effects of TFSA use. Results for each pair of columns run under the same conditions were averaged and are presented in Table 1.

TABLE 1

| Pore Volumes of Aqueous Fluids Injected Following Initial 1 Pore Volume | Percentage of Residual Oil Produced With Water Alone | Percentage of Residual Oil Produced With Water Containing TFSA | Percentage Increase in Residual Oil Produced With TFSA |
| --- | --- | --- | --- |
| 1 | 9.1 | 12.8 | 41 |
| 2 | 14.7 | 19.2 | 31 |
| 3 | 18.2 | 23.2 | 27 |

Use of TFSA substantially increased the volume of residual oil produced as compared with water alone.

EVALUATION TEST B

Six sandpack columns were prepared as described in Evaluation Test B. They were saturated with crude oil from the Ranger Zone of the Wilmington, Calif., field. The oil-saturated columns were aged for 2 days at 65° C. The columns were then held at 65° C. in an air bath while water from the supply used in flooding the Wilmington field was pumped into each column until one pore volume had been introduced into each. The fluids from each column were collected and measured and, as in the Example above, the amount of residual oil left in each column was computed.

Flooding of three of the columns with untreated water was then continued for an additional 3 pore volumes. The amount of oil produced after each additional pore volume was determined and used as reference with which to compare results obtained with TFSA in water.

A micellar solution containing 40 parts of the product of Example IV, 8 parts of ammonium dodecylbenzene sulfonate, 12 parts of n-butanol, and 40 parts of water was prepared. A solution of this product was prepared in Wilmington flood water at a concentration of 3,700 ppm. It formed a clear, homogeneous solution. This solution was pumped into each of the remaining three sandpack columns until 0.2 pore volumes had been injected. At this point a 200 ppm solution of the micellar solution in Wilmington flood water was injected in place of the previously injected 3,700 ppm solution. Pumping of solution was continued for an additional 2.5 pore volumes at which point untreated Wilmington water was injected for a final 0.3 pore volumes.

Produced oil was measured at each additional pore volume of injected aqueous phase. The amounts of oil produced were calculated as percentage of residual oil. Values for the three columns were averaged and compared with the average production with untreated waterflooding. Results of this test are given in Table 2.

Earlier tests, conducted as described herein, were run in which a solution of ammonium dodecyl benzene sulfonate and n-butanol in Wilmington flood water was used in concentrations equal to those present in the micellar solution of the product of EXAMPLE IV employed in the present test. In no case were results detectably different from those conducted with water alone.

TABLE 2

| Pore Volumes of Aqueous Fluids Injected Following Initial 1 Pore Volume | Percentage of Residual Oil Produced With Water Alone | Percentage of Residual Oil Produced With Water Containing TFSA | Percentage of Increase in Residual Oil Produced With TFSA |
| --- | --- | --- | --- |
| 1 | 3.7 | 8.0 | 116 |
| 2 | 7.2 | 17.6 | 144 |
| 3 | 8.8 | 24.8 | 182 |

IMPLEMENTATION OF THE INVENTION

As indicated above, introduction of the TFSA composition into the waterflood process may be accomplished in numerous ways. Simplest, perhaps, is the continuous introduction, with rapid dispersion such as may be obtained through a centrifugal pump, into the flood water stream. The amount required varies with the formation being treated, the character of the oil and water and the specific TFSA composition used, but will generally be within the range of from between about 5 to about 300 ppm of flood water injected. Occasionally, with especially viscous and refractory oils of high asphaltene content or where lower reservoir temperatures are encountered, somewhat higher concentrations of up to 500 to 2,000 parts per million may be more effective.

An especially useful and effective means of application is that of introducing the TFSA composition into the water stream as an emulsion. The compositions generally may be emulsified with one of numerous commercially available emulsifying agents, either cationic, anionic or nonionic or mixtures thereof. The compositons may also be incorporate into micellar or transparent emulsions of extremely small size for injection into the water stream. The previously cited U.S. Pat. No. 2,356,205, dated Aug. 27, 1944, to Blair and Lehmann shows numerous micellar emulsion formulae into which TFSA compositions may be incorporated by relatively minor changes in formulation.

Rather than introduce the compositions continuously into the flood water, one may, often with greater effect and lower cost, introduce a higher concentration of compound for only a part of the time. Commonly, this takes the form of batch or slug treatment early in the history of the flooding operation usually to be continued for a period of time covering up to 1% to about 20% of the estimated total time of water injection. Occasions may arise where two or more periods of batch treatments are utilized.

Where slugs or batches are employed, the concentration of TFSA composition injection is higher than for the continuous injection case, very roughly in proportion to the ratio of the total volume of water to be injected to the volume of the slug. Generally, however, it has been found that results equivalent to those obtained with continuous treatment can be accomplished with less TFSA if an early or "front end" slug is introduced.

Instead of introducing an aqueous slug one may inject a solution of the TFSA in a suitable organic solvent. Such solvents include hydrocarbons with solubility parameters equal to or above that of the selected TFSA, such as, for example, benzene, xylene, toluene, certain aromatic petroleum fractions, turpentine, tetralin and the like. Alternatively, polar or semipolar solvents in wide variety may be used. Satisfactory solvents for most TFSA compositions include hexanol, cresol, butanol, diisobutyl ketone and mixtures of such solvents with hydrocarbons. It is preferred to use solvents with relatively low water solubility. These, too, are usually the most readily available and economic solvents to use. In some applications it may be highly desirable to incorporate viscosity increasing agents into the organic solution slugs in order to better distribute the fluid into the formation being flooded and to lessen excessive penetration into more permeable or "thief" strata.

Effective "thickening" or viscosity increasing agents include polybutylene, polyisoprene, polyacrylic acid esters and other high molecular weight polymers which are soluble in organic solvents.

The improvements in oil recovery possible from use of TFSA compositions is not limited to ordinary waterfloods. Positive enhancement of results are also obtainable in connection with other so-called "chemical" or "surfactant" waterfloods, including polymer or pusher floods where water soluble polymers of high molecular weight are dissolved in the water to impart higher viscosity and improved distribution; micellar floods, such as those described previously; caustic floods; silicate floods; detergent floods; emulsion floods; amine floods; and others wherein some soluble additive is added to the flood water.

In all such applications the range of concentrations and use rates of the selected TFSA is about the same as with simple waterflooding. In most of these applications the use of a front end slug treatment is desirable, possibly excepting the case of polymer or pusher floods where the injection of at least some polymer ahead of the selected TFSA may be indicated by reservoir characteristics.

In general, it is highly desirable to institute the use of the TFSA composition as soon as possible after waterflooding, pressure maintenance or any such water injection program is started. Early contact of reservoir oil with the TFSA facilitates its production by natural as well as artificial water drive.

Nevertheless, since most ordinary secondary waterflood operations leave a large fraction of the oil in the producing strata, it is often economically feasible to carry out a second waterflooding operation (tertiary recovery) utilizing the present invention for the recovery of additional oil.

Other variations and combinations of enhanced recovery procedures employing the present invention will be apparent to those skilled in the art of petroleum and bitumen production.

For example, large deposits of viscous oils are known to exist in the United States, Indonesia, Canada, Venezuela and elsewhere in extensive formations where insufficient reservoir energy exists to produce reasonable flow of the oil into bore holes. Such formations appear amenable to flooding with hot water which can be further enhanced in effectiveness by addition of a properly selected TFSA composition in accordance with this invention.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed is:

1. A method of recovering petroleum from a subterranean reservoir, comprising the steps of:
    (a) introducing through an injection well a predeterminable amount of polyalkylene oxide adduct of a fusible phenolic, hydrocarbon-soluble synthetic resin, said resin containing from about 4 to about 16 phenolic groups and being a condensate of an ortho or para alkyl or cycloaliphatic substituted phenol and an aldehyde, said adduct being formed by further condensation of said condensate resin with ethylene oxide and at least one other alkylene oxide containing 3 or 4 carbon atoms, said adduct containing more than about 1% by weight and less than about 50% by weight of phenolic resin moiety, the total reacted alkylene oxide moiety comprising from between about 25% by weight and about 80% by weight alkylene oxide residues and from between about 20% by weight and about 75% by weight ethylene oxide residues, said adduct: (1) being soluble in water in excess of 1% at 25° C.; and (2) a 1% aqueous solution of said adduct having a cloud point of less than about 70° C.;
    (b) contacting said petroleum in said reservoir with an effective thin film forming amount of said polyalkylene oxide adduct; and
    (c) introducing into the formation an aqueous medium to urge said petroleum toward and through a producing well.

* * * * *